(12) United States Patent
Sawicki et al.

(10) Patent No.: US 11,608,277 B1
(45) Date of Patent: Mar. 21, 2023

(54) PORTABLE, HAND-CARRIED SYSTEM AND METHOD FOR PROVIDING ACCESSIBLE ELECTRICAL POWER AND FOR PRODUCING A SOURCE OF CONSUMABLE WATER EITHER THROUGH FILTRATION OR DESALINATION

(71) Applicant: ANSA TECHNOLOGIES, INC., Boca Raton, FL (US)

(72) Inventors: Waldemar Sawicki, Lighthouse Point, FL (US); David Tristan Antello, Boca Raton, FL (US)

(73) Assignee: Ansa Technologies, Inc., Pompano Beach, FL (US)

( * ) Notice: Subject to any disclaimer, the term of this patent is extended or adjusted under 35 U.S.C. 154(b) by 865 days.

(21) Appl. No.: 16/239,966

(22) Filed: Jan. 4, 2019

Related U.S. Application Data (60) Provisional application No. 62/613,790, filed on Jan. 5, 2018.

(51) Int. Cl.
| | | |
|---|---|---|
| C02F 1/02 | (2006.01) | |
| C02F 1/00 | (2023.01) | |
| C02F 1/44 | (2023.01) | |
| C02F 1/46 | (2023.01) | |
| E03B 7/07 | (2006.01) | |
| C02F 1/32 | (2023.01) | |

(52) U.S. Cl.
CPC ............ *C02F 1/002* (2013.01); *C02F 1/325* (2013.01); *C02F 1/441* (2013.01); *C02F 1/442* (2013.01); *C02F 1/4604* (2013.01); *E03B 7/074* (2013.01); *C02F 2201/46165* (2013.01)

(58) Field of Classification Search
CPC ............... C02F 1/02; C02F 1/32; E03B 7/074
See application file for complete search history.

(56) References Cited

U.S. PATENT DOCUMENTS

2015/0166385 A1* 6/2015 Boerm .................. B01D 61/08
210/652

FOREIGN PATENT DOCUMENTS

| CN | 1468815 A | * | 1/2004 |
| CN | 201144180 Y | * | 11/2008 |

(Continued)

*Primary Examiner* — Cameron J Allen
(74) *Attorney, Agent, or Firm* — Steven C. Stewart (57) ABSTRACT

A universal water purification system and method that can desalinate salt water or just filter fresh water. Preferably, the system is portable and relatively lightweight and provides for emergency or recreational safe power and water accessibility. The components of the system can be installed on an aluminum frame and preferably include a waterproof front control panel, four pre-filters, a reverse osmosis membrane, ultraviolet (UV) LED lamp, a high pressure reverse osmosis (RO) pump and a low pressure water supplying pump, an electro valve preferably with a manual override in case of power loss, an additional electro valve, a plurality of quick connect couplings (preferably three), a power bank, an internal inverter, a universal power supply and battery charger preferably disposed within a military style suitcase. In a preferred embodiment, the suitcase can be a PELICAN brand case. The system can provide a power bank, universal power supply (12V, 24 V, 90-260V 409-70 HZ), wide range battery charger, and water filtration and desalination unit for both outdoor and indoor applications.

20 Claims, 4 Drawing Sheets

(56) References Cited

FOREIGN PATENT DOCUMENTS

| | | | |
|---|---|---|---|
| CN | 205894167 U | * | 1/2017 |
| CN | 207347328 U | * | 5/2018 |
| KR | 20080112169 A | * | 12/2008 |

* cited by examiner

Fig. 4

PORTABLE, HAND-CARRIED SYSTEM AND METHOD FOR PROVIDING ACCESSIBLE ELECTRICAL POWER AND FOR PRODUCING A SOURCE OF CONSUMABLE WATER EITHER THROUGH FILTRATION OR DESALINATION

This application claims the benefit of and priority to U.S. Provisional Patent Application Ser. No. 62/613,790, filed Jan. 5, 2018, which is incorporated by reference in its entirety for all purposes.

1. FIELD OF THE DISCLOSURE

The disclosure generally relates to portable water treatment methods and in particular to a portable water treatment method and system that produces a supply of consumable water under various types of conditions, as well as providing for a universal power supply and battery charger.

2. BACKGROUND OF THE DISCLOSURE

Current portable systems for providing consumable water suffer from one or more of the following problems: (a) not knowing the type of water source and therefore not knowing whether filtration or desalination is needed; (b) not having a power source available for powering the system; (c) filtration capability using standard media; (d) not being able to reach the water source due to distance, elevation or a well water source; (e) powering of a long distance water pump; (f) having untrained persons operating the water purification equipment; (g) having contaminated water getting through damaged membranes; (h) issues with replacing internal lithium batteries; (i) issues with having floating debris at the surface of the water source versus having mud at the bottom of the water source; (j) the weight of the reverse osmosis ("RO") membrane housing; (k) replacing the RO membrane out in the field; (l) determining whether the filter, such as a Nephros filter, is correctly installed or needs to be flushed; (m) determining the status of any pre-filters or if they are correctly installed; (n) determining proper connections for the hoses used with the system; (o) water leaks in the system case or housing when one or more of the hoses are removed; (p) issues with accessing the internal components of the system; (q) issues with fastening or securing the system to a protective case; (r) issues with having contaminated water becoming mixed with clean water; (s) potentially dangerous electrical currents inside the unit or system; (t) fragile ultraviolet ("UV") lamps breaking during transport; (u) insufficient contact time for the water inside the UV lamp; (v) issues with extended range water sources; and (w) issues with regard to handling and mobility.

Additionally, with the water and power supply infrastructure aging, and with natural disasters on the rise, down time in both available consumable water and power delivery to homes has also increased in frequency.

The disclosed novel system and method is directed to overcoming or reducing the above-noted problems with current portable systems for producing clean potable drinking water.

SUMMARY OF THE DISCLOSURE

A portable water purification unit is generally disclosed that can operate as a filtration or desalination system and is preferably contained within a hard-shell and/or rugged case suitable for harsh and various types of environments. In one non-limiting embodiment, the system, along with the case, can weigh less than 100 pounds and preferably less than 98 pounds, such that it can be easily hand-carried by preferably two individuals out in the field and in use. In one non-limiting example, the hard-shell/rugged case can be one or more of the rugged cases offered by Pelican Products, Inc. and sold under the PELICAN brand name.

Preferably the system can be powered by any outside electrical source and can also be powered with an internal, removable, rechargeable battery back. The system can draw water from a distance, such as, but not limited to, from around 200 feet away, through the use of a positive displacement pump. The system can be configured or designed such that it can filter water down to preferably 0.005 micron without the use of any power. The system can use a light emitting diode ("LED") ultraviolet ("UV") light as one of the preferred multi-filtering stages.

The disclosed novel system and method provides the ability to perform either RO or filtration by a single system, with the system having different pathways for each capability (RO and Filtration). The system can preferably filter at a 0.005 micron level in its filtration mode, which is preferably separate from its desalination/RO mode at a 0.0001 micron level.

DETAILED DESCRIPTION

Figure 1:
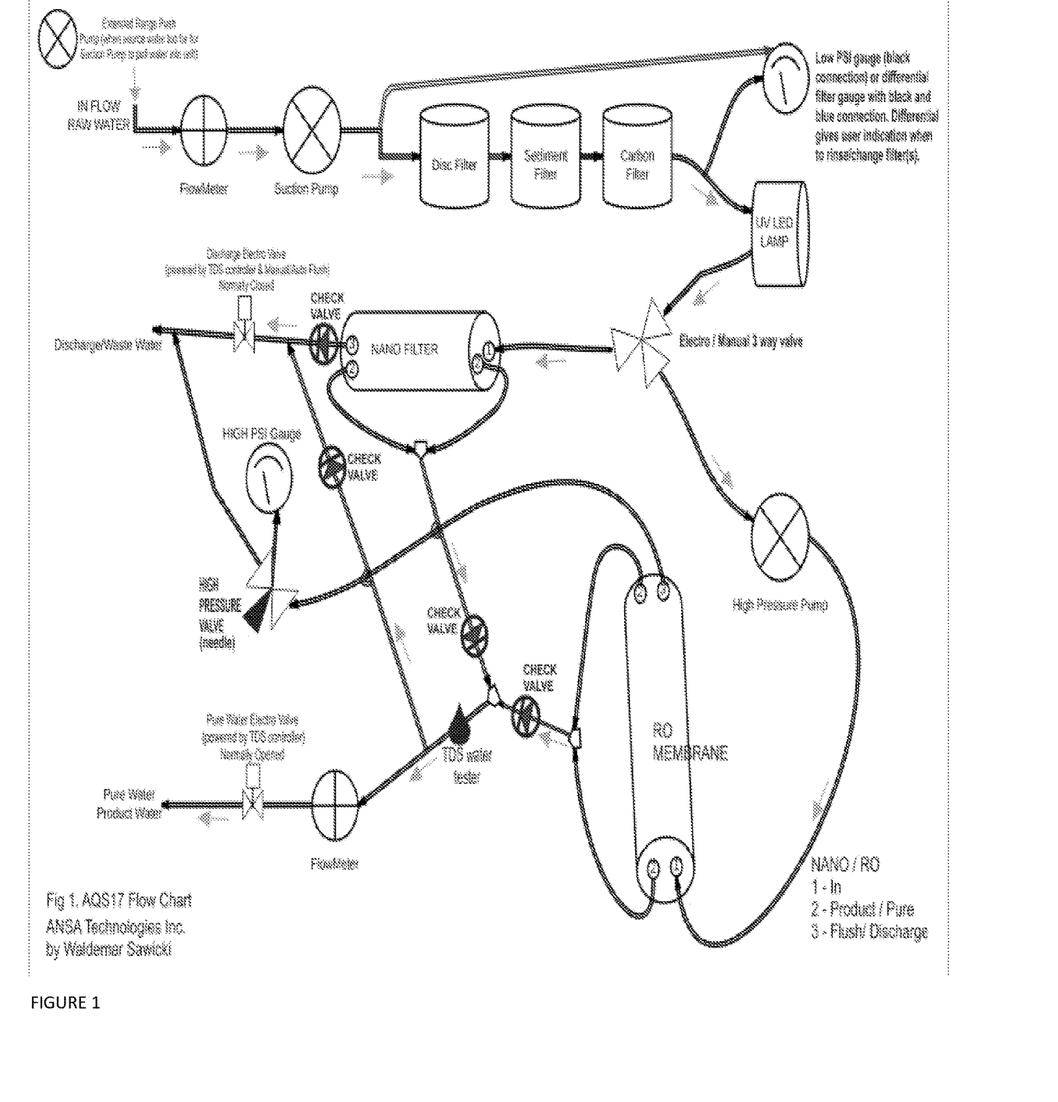
FIG. 1 is block diagram and process flow of the preferred embodiment for the system and method in accordance with the present disclosure.

As seen in the drawings a preferred embodiment and method for the disclosed novel system and method for producing consumable water and serving as a filtration or desalination system, while also serving as a power source, is shown. FIG. 1 shows a preferred configuration/system layout/schematic for the novel system and method.

A water inlet hose/pipe/conduit for taking in (in flow of) water from a water source can be provided for introducing water into the system for filtration or desalination depending on the nature or physical characteristics of the water (i.e. dirty or contaminated water, salt water, etc.). A suction pump can be provided to pull the water into the system for processing. For situations in the field where the source of water is located at a distance from the system such that the suction pump is unable to pull the water into the system, an extended range push pump (positive displacement pump) can be preferably provided at the water source to push the water, preferably through an extended hose/conduit/pipe in communication with the in-flow hose/pipe/conduit, towards the system where the suction pump can then pull the water into the system or the external push pump can push the water into the system. Accordingly, the inlet water flow is preferably pumped into the unit/system by the internal suction pump and/or a preferably long distance, low-voltage, external intake pump that can be used for sources of water remotely located from the system. In one non-limiting embodiment, the external intake pump can be used to feed water into the system from water sources located up to approximately 200 yards from the location of the system. In another non-limiting embodiment, the length can be approximately 200 feet. Other lengths can also be used and all are considered within the scope of the disclosure. However, this distance is not considered limiting and other distances can be selected and types of pumps can be selected and are considered within the scope of the disclosure. Preferably, the intake is accomplished through the use of hoses, that can be connected through the use of a quick connect hose couplings on a front panel of the system (1 of 3 available for external connection, but not limited to, and each being preferably different to avoid mistakes).

Once the water has entered into the system it flows through a path of one or more filters, which can be preferably three filters preferably provided with see-through filter housings. The filter cartridges can include a disc filter, a sediment filter and a carbon filter. However, such is not considered limiting and any other types of filters can also be provided in addition to the disc, sediment and/or carbon filter or in lieu thereof and are also considered within the scope of the disclosure. As a non-limiting example, other filters or media cartridges needed for a raw water problem can also be used and provided. Additionally, though FIG. 1 shows the filters in a particular order of disc, sediment and carbon, such order is not considered limiting and the filters provided can be provided in other configurations and all are considered within the scope of the disclosure. Preferably, the filters are accessible in the front of their respective or corresponding housings such that they are easy to replace or rinse without having to remove the entire purification unit from the case. Furthermore, in a preferred but not limiting embodiment, the disc filter can be held by a top to bottom fastening mechanism to allow it to fit a 5-inch filter housing. A pressure gauge or differential filter gauge can also be preferably provided at the output of the filters to provide the user with an indication/notification when one or more of the filters need to be rinse or changed. In one non-limiting embodiment, an alarm/display (audible or visual) can be in communication with the gauge(s) to further provide notification to the user of the need to rinse or change one or more of the filters, in addition to a read-out of the gauge itself and to shut off the entire system if the filters are too fouled.

After the water has gone through the above-referenced multi-stage initial filtering, the filtered water can be directed to and exposed to a UV light module, which in a preferred but not limiting embodiment can be a UV LED lamp. The UV LED lamp can be provided with an aluminum radiator and cooling fan and is provided to sterilize the water before it reaches the nano filtration or reverse osmosis "RO" purification/desalination stage. A UV lamp signal light/controller can be provided to show or otherwise indicate that the UV LED lamp is working properly.

After being sterilized by the UV LED lamp, the water flow schema (in conjunction with a valve such as an electro/manual 3-way valve) allows the operator/user to choose between a higher flow nano filtration product water or a lower flow RO purified/desalination selection. In a default setting, the system can be configured such that the water flow through the electro/manual valve is directed into the nano filtration which can be preferably positioned under the 3 pre-filter housings, though such position is not considered limiting. The nano-filtration can also be housed within a see-through housing, such as, but not limited to a heavy duty polycarbonate housing. The housing can be provided with specially designed endcaps to allow for a double side pure water flow. With one side being the "in flow" and the opposite side being a flush "out flow".

When in the default setting which can preferably be the nano filtration mode, a flush valve timer can turn the flush electro valve "on" for an initial flush of the nano filter (i.e. nano-filter offered under the brand name NEPHROS or other similar nano-filter, etc.) for a set or predefined length of time. The length of time can be adjusted by the operator/user where needed or the flush can be manually turned on by pressing or otherwise selecting a flush button/control preferably located on the control panel for the system.

In situations where no external power source, or any other electrical power source, is available and the battery preferably provided with the system is drained or depleted, the system can still be used for filtering water, where the external water source flows into the system/unit at a water pressure preferably above about 10 psi (i.e. similar to at least the psi from a kitchen/bathroom/garage/garden tap or a tank placed at a higher elevation for gravitational flow). In such situations, a plug with direct access to the filter(s) can also be provided and the UV LED lamp can be powered through a preferably supplied small solar panel or other external power source.

Where reverse osmosis/desalination of the water is desired preferably the RO option button is pressed or otherwise selected by the operator/user, though, it is also within the scope of the disclosure to have the RO selection be the default setting and the operator/user select a filtering option for nano-filtering of the water instead of RO. However, with the nano-filtering set as the default, by selecting the RO option, the filtration/purification valve (i.e. electro/manual 3-way valve) redirects the water flow into the line with the high-pressure pump. The valve can be manually changed by the operated/user to also create the redirect of the water when power is not available to actuate the electro valve.

Though not considered limiting, the high-pressure pump's motor RPM cycles can be set to 1200 or about 1200. However, based on certain conditions or desires, flow can be increased by increasing the RPM, such as, but not limited to, a preferred maximum of 1400 RPM or about 1400 RPM or the RPMs can be decreased to 1200 RPM to save energy. Preferably, the pressure of the pump and flowrate can be regulated by a high-pressure valve on the system control panel. An hour counter can be provided on the control panel and used to count the high-pressure pump's operational hours for oiling and any other required maintenance. Incoming low-pressure values and the RO high pressure values can be displayed on the front panel of the control panel using gauges or other displays, such as LED displays.

The housing for the RO membrane can be constructed from a combination polycarbonate and carbon fiber material to maintain the system's durability and light weight. However, other materials that will also achieve these characteristics can also be used and are considered within the scope of the disclosure.

Three quick connect hose couplings can be installed on the front panel for easy hose connection for intake, discharge and product water. In a preferred embodiment, each of these connections can differ from the other connections in some manner, with such variations/differences provided to help eliminate or at least reduce mistakes of connecting a wrong hose to the wrong water line.

The system can be used for various purposes including, without limitation, for emergency and/or recreational purposes and can be provided within a rugged case, such as, but not limited to, a Pelican type suitcase. The system can be installed on an aluminum frame structure with a control panel and a back panel behind the filters for safe and quiet operation. The portable, rolling-capable water maker (nano filtration or RO purification/RO desalination unit) and power supply unit (i.e. a removable battery Power Bank, universal Power Source, large array Battery Charger) apparatus can preferably be designed for safety, portability, durability and universal application. The frame can be designed to fit within the case (i.e. the military/Pelican type suitcase), preferably with no changes needed to be made to the case. The system frame and body can easily be removed from the case by two handles preferably provided on the front frame panel (top and bottom). The integrity of the case (i.e. buoyancy, waterproof, dust proof features) is not changed as the case is not altered. When desired, handles on the case or frame can be used to increase ease of carry.

Various check valves can be provided with the various water lines flowing out of the nano-filter and RO membrane to ensure that cleaned water is not mixed with contaminated or salt water.

The battery pack or Power Bank provided can be enclosed in a heavy-duty case with a handle and can be removed from the system. The waterproof plug(s) Power Bank and fuse can be removed (slides out) by its handle from the system frame. This Power Bank can be charged by internal charger/inverter or external power supply or can internally or externally supply power. The Power Bank, Supply Power, Battery Charger operational features can be displayed on the front panel with LED display, battery charge indicator, AC/DC water proof input/output plugs and fuses. Preferably all of these are allocated on the front control panel.

In a preferred non-limiting embodiment, the unit Power Bank can use high performance 12V, 512 Wh LiFePO4 batteries with a balancer. However, other or alternative batteries can be used and are also considered within the scope of the disclosure. The system/unit can also be powered by external AC about 90-260V 40-90 Hz, 12V, 24V, etc. However, the voltage and Hz (frequency) range can also vary or be slightly altered from the values stated herein. The unit/system can supply power to: USB 2.1 amp, 12V (25 amp), 24V (20 amp) and 110/230V through external converters. Preferably, the 110/230V, 12V, 24V plugs can all differ with the available adapters to eliminate errors For the UV LED lamp, a series of LED lights preferably between about 245 and about 265 nm can be arranged in a serpentine style to maximize contact time between the UV light and the water. The water pathway may include a second pass of water through the LED bulbs. A proprietary sensor can be provided to measure the amount of light in the LED housing. Therefore, if the water is irradiated below a certain threshold, the UV LED controller may shut off the unit leaving only an illuminated light indicating there is a UV problem. The LED housing can be designed to withstand high heat and impacts by utilizing heat dissipation manifold and preferably completely insulated electrical connections.

Thus, disclosed herein is a portable, easy to operate, lightweight, safe system that supplies power and water on the go, in emergency, recreational or extreme situations. This system provides for both (a) a water treatment method through a series of stages resulting in nano water filtration and RO purification/desalination (though preferably not both at the same time) and (b) a power bank, universal power supply and a wide range battery charger. Accordingly, the system provides for self-sufficiency and immediate and safe access to both power and water. The Power Bank, preferably using safe and long-lasting lithium LiFePO4 batteries with balancer, can be designed to hold a charge for a long period and have a long cycle life. The power supply can accept power to charge the power bank or run the water system from 90 to 260 V, 40 to 90 Hz and can be used or sent anywhere in the world for quick assistance. The battery charger can charge 11 different battery types for car or even truck needs, (exact voltage, Hz and number of battery types can be increased for more power). The preferred low voltage, low amp pumps, electro valves, and UV LED Lamp allow the water unit/system to be safe and consume low energy. With the available power, the disclosed novel water treatment system and method produces maximum safe water for specific needs, with the operator having the option between nano-filtration and pure water RO purification/desalination treatment. The disclosed system is convenient to operate and aids in survival for the operator.

In summary, disclosed is a portable, hand-carriable, suitcase emergency/recreational portable system preferably comprising of a portable power and water maker, and a removable and replaceable battery bank of LiFe batteries. The system can be provided with a universal power source that can be fed by 12-24 V, 90-240 V, power source in one non-limiting embodiment. In a preferred, non-limiting embodiment, the system can be provided with a 25 amp battery array Battery Charger. The system also provides for water nano particle filtration preferably using a P-248 approved Nephros filter that filters down to 0.005 micron. An internal UV LED sterilization and RO purification/desalination device can also be provided. Preferably the system can be selectively switched from just filtration or to full desalination mode with one button/switch. Default settings for either filtration or desalination can be configured with the system.

The various electronic/electrical components system can be powered by battery and/or through plugging an electrical cord into an electrical outlet (when and where available).

Figure 2:
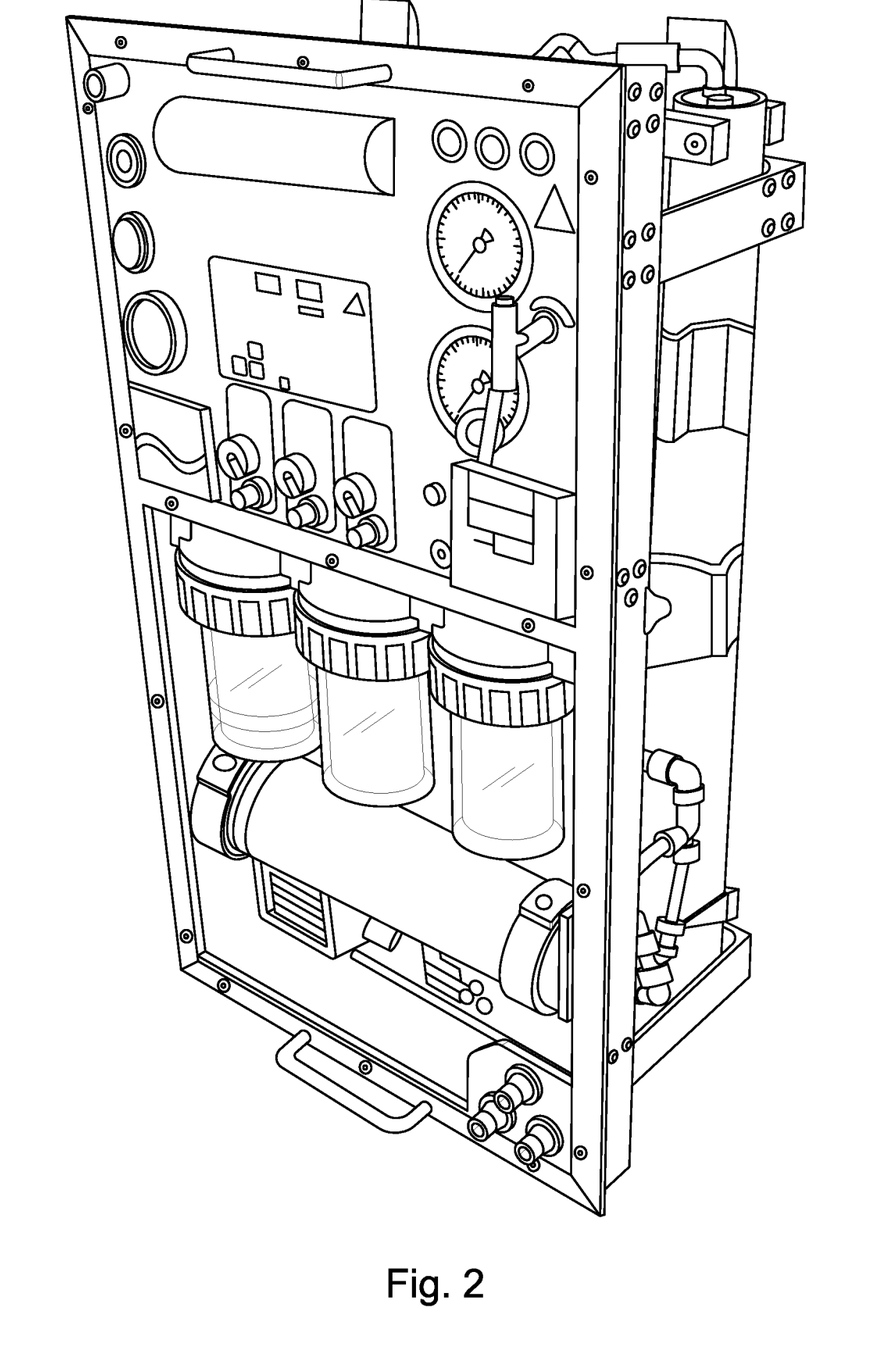
FIG. 2 is a perspective view of a preferred embodiment of the system/unit in accordance with the present disclosure.

FIG. 2 shows a preferred, though non-limiting, frame or housing that can be used for containing/securing the various components of the system. Preferably, the frame/housing can include various open areas for visually inspecting and removing/replacing/maintaining at least several of the components of the system. A control panel can be provided as part of the frame/housing where the operating/control buttons, levers, knobs, valves, manual valve controllers, etc. can be provided for operating the system. The pressure (high and low) and other gauges, as well as other analog or digital displays, screens, etc. can also be provided on the control panel.

When the frame/housing containing the system is vertically positioned (as in FIG. 2), the preferred three pre-filters (disc filter, sediment filter and carbon filter) all positioned downward and next to each other and the preferred nano-filter horizontally positioned and underneath the three pre-filters.

Figure 3:
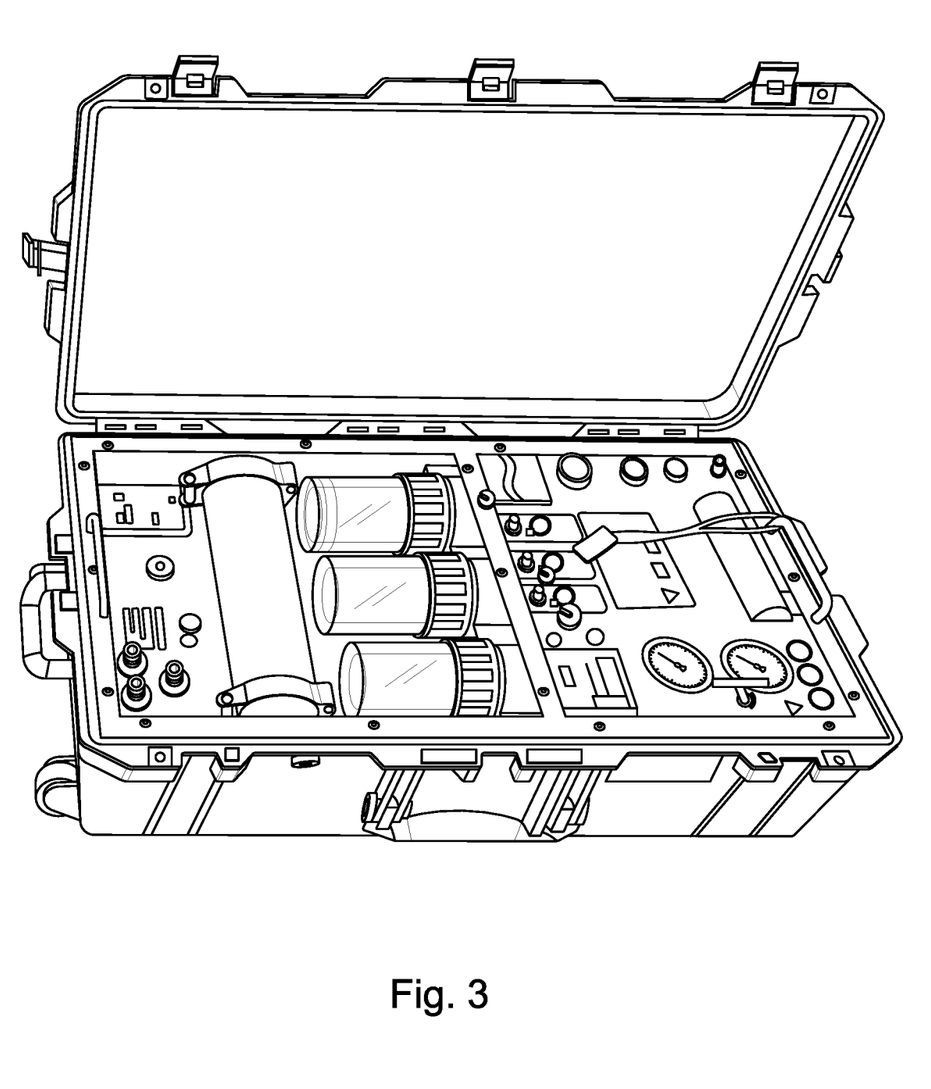
FIG. 3 is a perspective view of the system/unit of FIG. 2 shown disposed within a preferred hard shell/rugged case for hand carrying the system/unit in accordance with the present disclosure.
Figure 4:
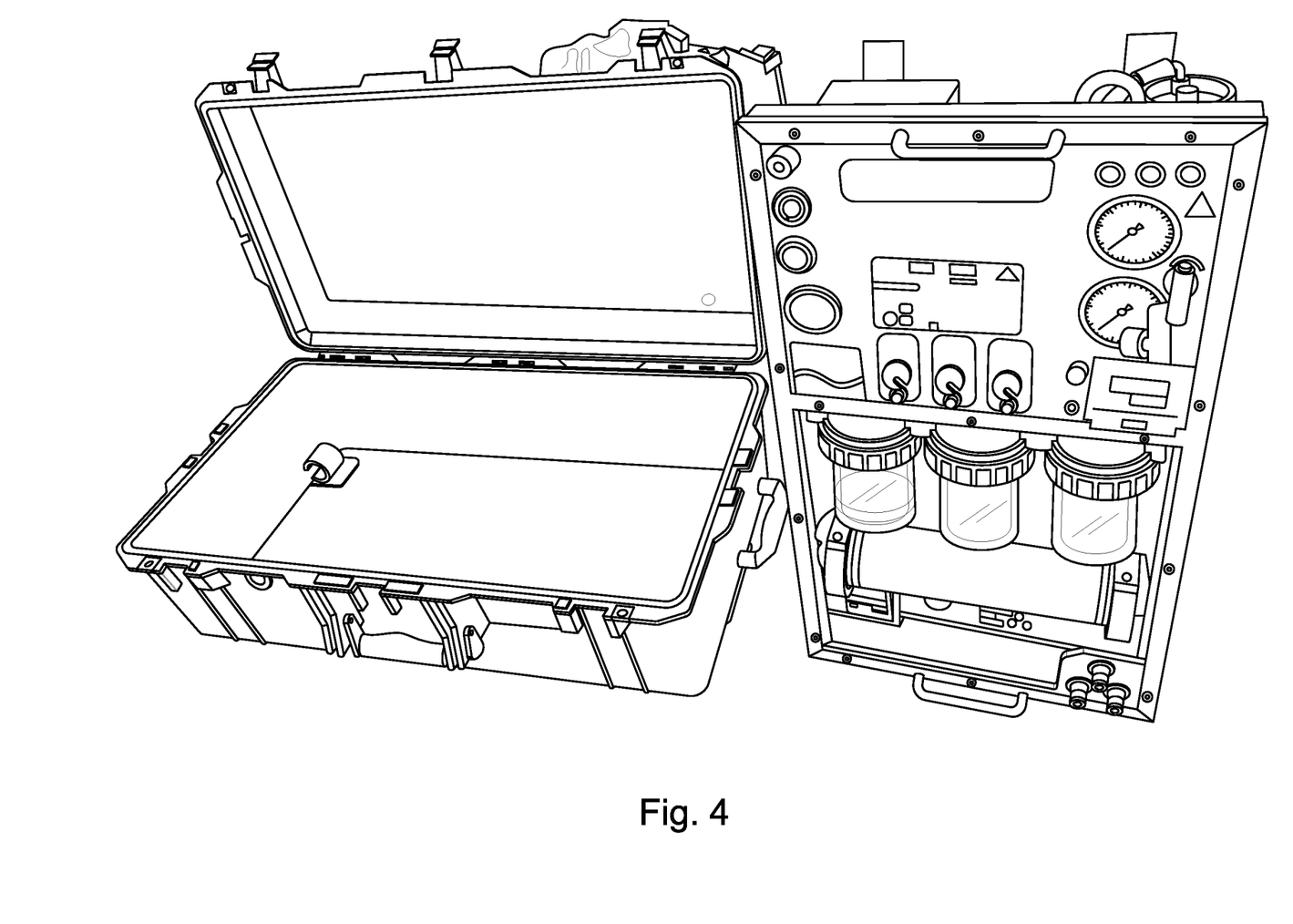
FIG. 4 is a perspective view of the preferred system/unit of FIG. 2 shown disposed outside of the hard shall/rugged case of FIG. 3.

As best seen in FIG. 4, the system/apparatus/unit can be installed on a frame preferably with a front panel and the frame can preferably be contained within a rugged suitcase/case (i.e. PELICAN or similar type case, etc.). Preferably two handles extending outward from the frame/housing allow the entire device (frame with system secured thereto) to be removed from the Pelican type case for maintenance, removal of the power bank, case replacement, etc. FIG. 3 showing the system/frame contained within the case and handles extending outward for easy removal from the case. Though the frame handles extend outward/upward, there is preferably enough room/clearance in view of the shape of the case's cover to allow the cover to be properly closed to fully close the case with the system/frame contained inside. The case is preferably provided with one or more handles, and preferably at least two handles for ease of transport and to allow to individuals to carry/transport the system (contained within the case) to its desired end location.

The system can function via command switches with the aid of monitoring devices (for example flowmeter, pressure gauges, volt, amp reader, fuses, high pressure pump hour counter, UV lamp controller, etc.) on the front panel or elsewhere on the unit. Front access to see-through housings for some or all of the filters/cartridges can be provided for monitoring/quick replacement. Preferably, no changes are needed to standard rugged cases that may be used to house the system, as the system/device installed on the frame with front panel and front cover preferably fits within a standard lightweight military/Pelican type case. The rugged case continues to maintain any waterproof, dust proof and buoyancy properties it normally contains.

Depending on the type of water source or the quality of water needed, the flow can be directed via the larger flow at less power consumption nano particle filtration, or the higher quality product water and higher energy usage of the RO purification/desalination treatment. Automated and manual flush function preferably works only in default nano filtration mode. When no electrical or battery power is available, the unit can be connected to an external water source with pressure (i.e. kitchen/bathroom/garden/tap or a gravity feed container that is elevated) and the natural pressure of the flowing water will allow the water to pass the pre-filter(s), UV Lamp (preferably being solar powered) and nano particle filter with no electrical or battery power supplied. The UV LED Lamp can be directly connected to a small solar panel or small battery supplying just enough energy to power the UV LED in such dire situations.

The disc filter of the pre-filter(s) can be held by top to bottom fastening design to fit a 5 inch filter housing. The UV LED lamp can be provided with an aluminum radiator and cooling fan for sterilizing water before it reaches nano filtration or RO purification stage. The nano filter is preferably housed or contained within a see-through heavy duty polycarbonate housing. The housing preferably has specially designed endcaps for double side pure water flow (i.e. one side 'raw in flow' and the opposite side flush 'out flow'). The RO membrane housing can be made from a combination polycarbonate and carbon fiber material to provide for durability and light weight properties. The Power Bank element can have a handle and waterproof plug(s) and can be used as a separate Power Bank when removed from the unit.

The disclosed novel system and method addresses the problems noted in the Background with current portable water treatment system by:

1. The system operates in either filtration or RO mode, so no pre-decision needs to be made as to what type of treatment system to bring when the type of water source is not known;

2. The system can be provided with an internal lithium battery pack to provide power, where no external power source is available;

3. The filter chosen for filtration can be a NEEPHROS or similar filter capable of going down to 0.005 micron which is exponentially smaller than any organism, providing effective removal by the filter, and at a higher level of removal as compared to standard media used with current treatment systems;

4. The system can be provided with a separate positive displacement pump which can feed the system/unit from a distance of approximately 200 feet (though not limiting), where the user cannot reach the water source with the system in view of a drop/incline or a well water source. The pump can also serve as a redundancy method for getting water into the system in case the internal suction pump fails;

5. The extended range pump can operate and be powered from the main system/unit using the internal battery pack or the external source powering the system, including, without limitation, an outlet or generator. The battery pack, also preferably provided with the system, can also be placed at the water source and independently feed the system and power the extended range/long-distance pump;

6. The system can preferably be provided with one key operation that can be preset to run full RO function. It can then be changed to filtration mode if needed to address the issue where the operator is untrained in the area of water purification equipment;

7. To address problems with contaminated water getting through damaged membranes, the system can be configured to provide for an automatic reroute of product water if it is above an acceptable adjustable threshold in PPM of TDS (Total Dissolved Solids). Preferably, the system shuts off the clean H20 hose and all water is sent to the discharge hose;

8. The preferably provided battery pack can be enclosed in a reinforced case with a handle that can easily be removed from the unit to allow the internal lithium batters to be easily replaced when necessary. The battery pack can also serve as an external power source that can be connected to a 12 v outlet to power external equipment such as cell phones, smart phones, tablets, laptops, etc.;

9. To address potential problems of having floating debris at the surface of water source vs. having mud at the bottom of a water source, the extended range pump can either be placed on the bottom of the water source or attached to a floater;

10. The combination of two materials (Polycarbonate and Carbon Fiber) in a heat merge process to make a high-pressure RO membrane housing reduces the weight of the housing and is very strong to withstand the high pressures used for RO/desalination by the system;

11. To address problem of replacing RO membranes in the field, the disclosed system can use two screw-on membrane end caps that are relatively very easy to remove in the field and without the need for special tools. The end caps can be designed for such easy removal;

12. The preferred transparent/clear polycarbonate housing for the NEPHROS filter allows the operator to confirm that the filter is properly installed and whether it needs flushing. With the housing, the filter can easily be drained for safe transport of the NEPHROS filter. The housing can be made longer to accommodate two or more NEPHORS filters for larger systems and higher water per minute flow rate;

13. By providing transparent/clear housings for the pre-filters the user/operator can easily determine the status of the filters and know if one or more of the filters needs replacement. The user can also readily determine which type of filter(s) is (are) installed. With respect to the filters, there are several options, such as, but not limited to, micron size, type of filter, etc.;

14. The hose couplings to intake/pure/drain hoses can be stainless steel garden hose style male fittings preferably provided with color coded bands to eliminate mistakes and allow the user/operator to quickly know/determine which hose goes with which connection. The stainless-steel fittings can be industrial quality and can preferably fit all standard size garden hose female couplings.

15. A rubber fitting can be placed on top of the stainless-steel couplings which can be pressed down when the pelican type case is closed. This eliminates water leakage in the case during transport and when the hoses are moved. The rubber or similar material can be semi-permanently attached to the closing side of the case so that once closed it can cover over the couplings, or it can be loosely connected to the bottom handle by a stainless-steel wire or chain and manually placed on top of couplings before closing the case;

16. The system is preferably not attached to the case and can be entirely removed from the case preferably by the use of a top and bottom handle that can be provided for easy access to the internal components of the system for troubleshooting, performing maintenance, removing water from inside the case, etc. This also allows the case to be used as a water reservoir for flushing the system/unit or for easily replacing the entire case if needed. Preferably, the handles on the top and bottom of the system/unit can be attached such that they fit perfectly when the case is closed. Once the case is closed the handles can fit exactly inside the unit, keeping it tightly in place without having to attach the system to the body of case and interfering with the integrity of the case (i.e. PELICAN style case, etc.);

17. A 12V TDS (Total Dissolved Solids) Controller can be provided and in conjunction with the electro-valve can reroute bad water to address the issue of contaminated water possibly mixing with the clean/treated water. Preferably, the default 'open' electro-valve only receives electrical current once the TDS value is higher than a preset range. The electro-valve when closed, directs water flow to the RO waste/NEPHROS flush water discharge hose;

18. Where no external electrical power is available and there is no internal battery, or the internal battery is drained/depleted, the system can be configured to still operate in a default filtration mode position which allows for garden hose level pressure for water flow through the system/unit and/or also a gravity feed to direct the water through the system/unit;

19. During battery power mode, the unit is completely safe: 12-24V DC—all water purification/filtration powered devices can work (pumps, electro-valves, UV lamp, TDS Counter are all powered by safe 12V or 24V). Thus, the system can operate for its intended purposes without the use of potentially dangerous electrical currents;

20. The preferred UV LED lamp for system can operate at between about 255 and about 265 nm wavelengths. A radiation sensor can be provided that measures the total energy produced inside the lamp. This ensures that an adequate disinfection is still active as individual LED bulbs begin to burn out or if they become broken, such as through transit/transport/use. Once below the threshold the system preferably shuts down;

21. The system/unit can be provided with a serpentine water path and/or multiple passes to assure enough contact time within a small chamber of the water with the UV lamp. This also allows for a smaller chamber and for conserving space;

22. The system is preferably provided with or can work in connection with an extended range compact floating intake pump to address issues with water sources located away from the system. The preferred extended range pump can be sealed and water proof, powered by an internal battery, has double pre-filters and a variable angle suction piece underneath the pump. The pump can typically run on its batteries for 4-6 hours supplying water from a distant water source preferably up to 30 meters away from the unit with no need of a power cable. Water proof cable connections allow it to be plugged into the pump to both charge batteries and/or power pump. A small waterproof Solar Panel can be positioned on the floating pump and plugged into the waterproof plug to charge batteries while the pump is supplying water on battery power.

The disclosed novel system and method treats a wide range of water sources (from sea water to lakes, ponds, rivers, wells and tap, pool or flood water) through a series of stages. Depending on the use of product water, source or available power, the unit can either process the water through a nano filter or RO purification/desalination membrane. The water unit can be powered by the internal Power Bank, external AC power supply (90-260V, 40-70 Hz), or external 12V or 24V batteries. The Power Bank can be removed from the unit and used as a separate Power Bank outside the unit, charged externally or internally.

Accordingly, the disclosed system and method provides for a portable hand-carriable desalination and/or filtration only system that can be provided with an integral power source and can also be powered by any AC, DC, 12 v, 24 v and solar power source in order to provide for true independence in any environment. The system is also preferably provided with a universal inverter and internal rechargeable battery pack. Furthermore, the preferred one-knob operation also provides for an extremely user-friendly system. Thus, a novel universal water purification system and method that can desalinate salt water or just filter fresh water is provided herein.

The word "line" refers to any item capable of transporting fluid, including, without limitation, pipes, piping, tubes, pipelines, tubing, conduits, hoses, cannulas, cylinders, etc.

The word "frame" or "housing" refers to the structure that is used for containing/securing the various components of the system. The frame or housing is not considered limited to any particular shape or dimensions, but in a preferred embodiment, should be sized and shape to allow it to hold the system components and fit within the desired carrying case, with the carrying case preferably being able to be closed. However, it is also within the scope of the disclosure, that the carrying case does not have to be fully closed. In one non-limiting embodiment, the carrying case can be constructed from a material(s) that allow it to float at water surface while the frame/housing and system components are disposed within the carrying case.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the Figure, it will be understood by those of ordinary skill in the art that various changes in form and details may be made therein without departing from their spirit and scope.

All components of the described system and their locations, electronic, fluid and mechanical communication/connection methods between the system components, pumps, power sources, lamp sources, filtering media, fluid flow diverters/valves, dimensions, materials, cases, values, etc. discussed above or shown in the drawings, if any, are merely by way of example and are not considered limiting and other component(s) and their locations, electronic, fluid and mechanical communication/connection methods, pumps, power sources, lamp sources, filtering media, fluid flow diverters/valves, dimensions, materials, cases, values, etc. can be chosen and used and all are considered within the scope of the disclosure.

Dimensions of certain parts as shown in the drawings may have been modified and/or exaggerated for the purpose of clarity of illustration and are not considered limiting.

Unless feature(s), part(s), component(s), characteristic(s) or function(s) described in the specification or shown in the drawings for a claim element, claim step or claim term specifically appear in the claim with the claim element, claim step or claim term, then the inventor does not considered such feature(s), part(s), component(s), characteristic(s) or function(s) to be included for the claim element, claim step or claim term in the claim for examination purposes and when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the system and method has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A portable system for producing consumable water and capable of both fresh water filtration and salt water desalination, the portable system comprising:
   a main fluid line adapted for fluid communication with a source of water;
   a suction pump in fluid communication with the main fluid line for drawing in fresh water or salt water from the source of water into the main fluid line for further processing;
   one or more filters disposed after the suction pump and provided for filtering fresh or salt water flowing through the main fluid line once the fresh or salt water is drawn in by the suction pump;
   an ultraviolet (UV) lamp for exposing fresh or saltwater filtered by the one or more filters to UV light for sterilization;
   a multidirectional valve in fluid communication with the main fluid line to selectively direct the fresh waterexposed to the UV light to a nano filter system and to selectively direct the salt waterexposed to the UV light to a reverse osmosis system;
   the nano filter system comprising:
   a) a first secondary fluid line in fluid communication with the valve, and
   a nano filter disposed within or as part of the first secondary fluid line for filtering fresh water directed into the first secondary fluid line by the multidirectional valve; and
   the reverse osmosis system including:
   a) a second secondary fluid line in fluid communication with the multidirectional valve, and
   b) a reverse osmosis ("RO") purification/desalination membrane disposed within or as part of the second secondary fluid line for purifying and desalinating salt water directed into the second secondary fluid line by the multidirectional valve, and
   a fluid output line for receipt of clean water exiting the nano-filter and exiting the purification/desalination RO membrane.

2. The portable system of claim 1 further comprising a removable frame mounting the suction pump, the one or more filters, the ultraviolet (UV) lamp, the multidirectional valve, the nano filter system and the reverse osmosis system.

3. The portable system of claim 1 wherein the one or more filters are a disc filter, a sediment filter and a carbon filter in fluid communication with each other and filtering the water drawn in through the suction pump.

4. The portable system of claim 1 further comprising a gauge in communication with the one or more filters to indicate an operation condition of the one or more filters.

5. The portable system of claim 1 further comprising a first nano filter fluid output line for receipt of waste water exiting the nano-filter; and a normally closed valve disposed within or as part of the first nano filter fluid output line controlling the flow and discharge of waste water out of the first nano filter fluid output line.

6. The portable system of claim 1 further comprising a first RO membrane fluid output line for receipt of water exiting the RO membrane, and a normally opened electro valve disposed within or as part of the first RO membrane fluid output fluid line controlling the flow of clean water that was either filtered by the nano filter or purified/desalinated by the RO membrane.

7. The portable system of claim 2 further comprising a first nano filter fluid output line for receipt of waste water exiting the nano-filter, a first RO membrane fluid output line for receipt of water exiting the RO membrane, and a discharge/waste water outlet extending out of the frame and in fluid communication with the first nano filter fluid output line, and a clean water outlet extending out of the frame and in fluid communication with the first RO membrane fluid output line.

8. The portable system of claim 2 further comprising a suitcase for removable coupling of and portable transportation of the removable frame, the suitcase having a rubber fitting to prevent leakage during transport and one or more carrying handles.

9. The portable system of claim 8 wherein a combination of the suitcase and the frame weigh under one hundred pounds.

10. The portable system of claim 2 further comprising a water inlet extending out from the frame and in fluid communication with the main fluid line.

11. A portable system for producing consumable water and capable of both water filtration and water desalination, comprising:
   a main fluid line adapted for fluid communication with a source of water;
   a suction pump in fluid communication with the main fluid line for drawing in water from the source of water into the main fluid line for further processing;
   one or more filters disposed after the suction pump and provided for filtering water flowing through the main fluid line once the water is drawn in by the suction pump;
   an ultraviolet (UV) LED lamp positioned near the main fluid line after the one or more filters for exposing water filtered by the one or more filters to UV light for sterilization of the water exposed to the UV light;
   a multidirectional valve in fluid communication with the main fluid line and to selectively direct the UV light exposed water to a first secondary fluid line and a second secondary fluid line;

a nano filter disposed within or as part of the first secondary fluid line for filtering water directed into the first secondary fluid line by the multidirectional valve;

a first nano filter fluid output line for receipt of waste water exiting the nano filter;

a second nano filter fluid output line for receipt of clean water existing the nano filter;

a normally closed electro valve disposed within or as part of the first nano filter fluid output line controlling the flow and discharge of waste water out of the first nano filter fluid output line;

reverse osmosis ("RO") purification/desalination membrane disposed within or as part of the second secondary fluid line for purifying and desalinating water directed into the second secondary fluid line by the multidirectional valve;

a first RO membrane fluid output line for receipt of water exiting the RO membrane, wherein the second nano filter fluid output line in fluid communication with the first RO membrane output line;

a normally opened electro valve disposed within or as part of the first RO membrane fluid output fluid line controlling the flow of clean water that was either filtered by the nano filter or purified/desalinated by the RO membrane;

coupling the suction pump, UV LED lamp, the one or more filter, the nano filter and the RO membrane to a housing;

positioning the one or more filters and the nano filter within an open area of the housing so that the one or more filters and the nano filter are externally accessible, viewable for monitoring and removable for replacement or maintenance;

a discharge/waste water hose coupling outlet extending out of the housing and in fluid communication with the first nano filter fluid output line;

a clean water hose coupling outlet extending out of the housing and in fluid communication with the first RO membrane fluid output line;

a hose coupling water inlet extending out of the housing and in fluid communication with the main fluid line; and a rigid suitcase for removably receipt of and portable transportation of the housing, the suitcase having one or more carrying handles;

wherein the suitcase and the housing weighing under one hundred pounds.

12. The portable system of claim 11 further comprising a positive displacement pump disposed at a location of the source of water for pushing water from the source of water towards the inlet conduit where the water can then be drawn in by the suction pump.

13. The portable system of claim 11 wherein the one or more filters include a disc filter, a sediment filter and a carbon filter in fluid communication with each other, and wherein the one or more filters filter the water drawn in through the suction pump.

14. The portable system of claim 11 further comprising a battery pack for providing power to the UV LED lamp and electro valves.

15. A method for producing consumable water from both fresh water and salinized water, the method comprising:

receiving water via a main fluid line from a source of water;

drawing in with a suction pump fresh water or salinized water from the source of water into the main fluid line for further processing;

filtering the fresh water or the salinized water in the main fluid line with one or more filters;

sterilizing the filtered fresh or salinized water by exposing the filtered fresh or salinized water to ultraviolet (UV) light;

in response to drawing in fresh water with the suction pump, directing with a multidirectional valve the filtered fresh water to a nano filter system;

in response to drawing in salinized water with the suction pump, directing with the multidirectional valve the filtered salinized water to a reverse osmosis system; and outputting via a fluid output line clean water exiting the nano-filter system or exiting the reverse osmosis (RO) system.

16. The method as recited in claim 15 wherein in response to drawing in fresh water with the suction pump, directing with a multidirectional valve the filtered fresh water to a nano filter system comprises:

in response to drawing in fresh water with the suction pump, directing with a multidirectional valve the filtered fresh water exposed to the UV light to the nano filter system; and filtering with the nano filtration system fresh water exposed to the UV light.

17. The method as recited in claim 15 wherein in response to drawing in salinized water with the suction pump, directing with the multidirectional valve the filtered salinized water to a reverse osmosis system includes:

in response to drawing in salinized water with the suction pump, directing with the multidirectional valve the filtered salinized waterexposed to the UV light to a reverse osmosis system; and purifying with the RO system salinized water exposed to the UV light.

18. The method as recited in claim 15 further comprising:

mounting the suction pump, the one or more filters, the ultraviolet (UV) lamp, the multidirectional valve, the nano filter system and the reverse osmosis system to the removable frame.

19. The method as recited in claim 18 further comprising:

inserting the suction pump, the one or more filters, the ultraviolet (UV) lamp, the multidirectional valve, the nano filter system and the reverse osmosis system while mounted to the removable frame into a suitcase with a handle; and carrying, by a user using the handles, the suitcase containing the inserted suction pump, the one or more filters, the ultraviolet (UV) lamp, the multidirectional valve, the nano filter system and the reverse osmosis system mounted to the removable frame.

20. The method as recited in claim 19 further comprising:

removing from the suitcase the suction pump, the one or more filters, the ultraviolet (UV) lamp, the multidirectional valve, the nano filter system and the reverse osmosis system while mounted to the removable frame from the suitcase.

* * * * *